United States Patent
Dureau et al.

(10) Patent No.: US 6,288,738 B1
(45) Date of Patent: Sep. 11, 2001

(54) METHOD AND APPARATUS FOR SEAMLESS CONNECTIVITY OF WIDE-BAND NETWORKS AND NARROW-BAND NETWORKS

(75) Inventors: Vincent Louis Dureau, Menlo Park, CA (US); Regis St. Girons, Fourqueux (FR)

(73) Assignees: Sun Microsystems, Inc., Palo Alto; OpenTV, Inc., Mountain View, both of CA (US)

( * ) Notice: Subject to any disclaimer, the term of this patent is extended or adjusted under 35 U.S.C. 154(b) by 0 days.

(21) Appl. No.: 09/356,791

(22) Filed: Jul. 20, 1999

Related U.S. Application Data

(63) Continuation of application No. 08/658,498, filed on Jun. 5, 1996, now Pat. No. 6,118,472.

(51) Int. Cl.[7] .................................................... H04N 7/10
(52) U.S. Cl. ................. 348/6; 725/109; 725/112; 725/114; 725/54; 725/148
(58) Field of Search ..................... 725/109, 110, 725/111, 112, 113, 54, 63, 68, 82, 96, 148, 114; H04N 7/10

(56) References Cited

U.S. PATENT DOCUMENTS

| | | | |
|---|---|---|---|
| 5,488,412 | * | 1/1996 | Majeti et al. .................... 725/111 |
| 5,640,453 | * | 6/1997 | Schuchman et al. ................ 380/10 |
| 5,673,322 | * | 9/1997 | Pepe et al. ......................... 380/49 |
| 5,706,507 | * | 1/1998 | Schloss ............................ 395/615 |
| 5,761,602 | * | 6/1998 | Wagner et al. ..................... 725/34 |
| 5,790,753 | * | 8/1998 | Krishnamoorthy et al. .... 395/200.33 |
| 5,857,142 | * | 1/1999 | Lin et al. ............................ 725/73 |
| 5,956,391 | * | 9/1999 | Melen et al. ...................... 379/114 |
| 6,118,472 | * | 9/2000 | Dureau et al. .................... 725/109 |

* cited by examiner

*Primary Examiner*—Reinhard J. Eisenzopf
*Assistant Examiner*—Linus H. Lo
(74) *Attorney, Agent, or Firm*—Park, Vaughan & Fleming LLP

(57) ABSTRACT

An apparatus for seamless connectivity between a narrow-band network like the Internet and an interactive TV wide-band network, and methods of operating the same, support on-the-fly translation and routing of data between the Internet and the interactive TV wide-band network. The apparatus for interfacing between a wide-band network and a narrow-band network comprises a decoder having a decoder input, a first decoder port, and a second decoder port, which receives wide-band data from the wide-band network via the second decoder port and decodes the wide-band data to provide decoded data in response to decoder requests from the decoder input. A gateway coupled to the decoder, the narrow-band network, and the wide-band network, having a first gateway port to receive the decoder requests from the first decoder port, a second gateway port to interface with the narrow-band network, and a third gateway port to interface with the wide-band network, retrieves requested data from the narrow-band network in response to the decoder requests and transfers the requested data to the wide-band network for transfer to the decoder.

17 Claims, 3 Drawing Sheets

METHOD AND APPARATUS FOR SEAMLESS CONNECTIVITY OF WIDE-BAND NETWORKS AND NARROW-BAND NETWORKS

RELATED APPLICATION INFORMATION

This application is a continuation of U.S. patent application Ser. No. 08/658,498, now U.S. Pat. No. 6,118,472 which was filed on Jun. 5, 1996.

BACKGROUND OF THE INVENTION

1. Field of the Invention

The present invention generally relates to interfacing a wide-band network with a narrow-band network and more particularly to transparently interfacing a unidirectional wide-band broadcast network and the Internet.

2. Description of the Related Arts

Currently, there are two dominant digital infrastructures that are widely accepted and in public use. The first is the Internet structure also known as the world wide web based on narrow-band networks, and the second is Digital Pay television (TV) networks such as DirectTV™ based on wide-band networks.

Being the two dominant digital infrastructures, a single super hybrid infrastructure would provide an immense amount of information for its users. Users having access to the single super hybrid infrastructure would have limitless options available. However, no provisions have been made to converge the two infrastructures into a single super hybrid infrastructure. Moreover, consideration of the properties of each of these networks provides an understanding as to why the two infrastructure are not likely to converge into a single super hybrid infrastructure.

The Internet infrastructure relies on a backbone of limited bandwidth in view of the number of users and services that the Internet infrastructure supports. Users are typically limited to 28.8 kb/s (kilo bits/sec) accessing through telco lines. A fraction of the users are able to upgrade to cable modems capable of Mb/s (mega bits/sec) transfer rates. The terminals used to access the Internet possess high processing power and large amounts of storage. These terminals are commonly referred to as desktop computers. The terminal displays of these desktop computers also possess the ability to produce high quality pictures. In an effort to take advantage of the high processing power of the terminals and reduce bandwidth consumption of the Internet, programming for the Internet relies on the large amounts of computer caching available at the terminals. Increasing reliance is also placed on distributed processing, in which a portion of the processing is downloaded onto the terminal to complete the processing needed to access the various world wide web sites.

On the other hand, the wide-band network based Digital Pay TV networks rely on a wide-band broadcast monodirectional network combined with a point to point low bit rate (2400 bits/sec) bidirectional network. The terminals that receive the wide-band broadcast data possess low processing power and little to no storage media. The displays coupled to the terminals are low quality interlaced displays such as a typical National Television Standards Committee (NTSC) TV found commonly in most households. Thus, the terminals available to the wide-band networks possess low processing power with virtually no storage media for data and provide low quality displays compared to the Internet terminals.

Further advances based on the Digital Pay TV networks include interactive TV systems. In order to make interactive TV less costly and therefore more attractive to consumer acceptance, it is desirable to keep memory requirements in the receiver to a minimum. Thus, as development for interactive TV systems continues, the trend is to continue building terminals with low processing power and low storage requirements.

Contrary to the trend of maintaining low processing power and minimizing storage requirements, new Internet protocols that are being developed rely more on the processing power of the latest generation computers. Thus, as the Internet technology based on the narrow-band network develops and the interactive TV technology based on the wide-band network technology develops, the Internet technology and the interactive TV technology continue to alienate each other and move apart. Consequently, consumers seeking Internet access who subscribe to interactive TV are forced to acquire the latest generation computer. The cost of having both a subscription to interactive TV and the latest generation computer for Internet access can be cost prohibitive for the consumer. In order for the providers of interactive TV to supply a complete service, a transparent consumer interface between the wide-band network of interactive TV and the narrow-band network for the Internet is needed.

Therefore, it is desirable to provide Internet connectivity to low end terminals operating in an interactive TV wide-band network, and a method of operating the same that support on-the-fly translation and routing of data between the Internet and the interactive TV wide-band network for transparent access to the Internet.

SUMMARY

The present invention provides an apparatus for seamless connectivity between the Internet and an interactive TV wide-band network and methods of operating the same which support transparent on-the-fly translation and routing of data between the Internet and the interactive TV wide-band network. The novel seamless connectivity between the networks is based on a gateway that provides translation and routing of data. Thus, according to one aspect of the invention, a seamless connection for interfacing between a wide-band network and a narrow-band network comprises a decoder having a decoder input, a first decoder port, and a second decoder port, which receives wide-band data from the wide-band network via the second decoder port and decodes the wide-band data to provide decoded data in response to decoder requests from the decoder input. A gateway coupled to the decoder, the narrow-band network, and the wide-band network, and having a first gateway port to receive the decoder requests from the first decoder port, a second gateway port to interface with the narrow-band network, and a third gateway port to interface with the wide-band network, retrieves requested data from the narrow-band network in response to the decoder requests and transfers the requested data to the wide-band network for transfer to the decoder. The decoder receives the requested Internet data from the wide-band network.

According to one aspect of the invention the seamless connection further comprises a display device having a display input which displays the requested data and wherein the decoder includes a third decoder port coupled to the display input to provide decoded requested data to the display device. Thus, the requested Internet data is displayed on the display device.

According to another aspect of the invention, the first decoder port includes a bi-directional port, and the first gateway port also includes a bi-directional port. The gateway includes circuitry that parses the requested data to provide narrow-band data and wide-band data and transfers the narrow-band data for output to the first decoder port. The decoder receives the narrow-band data and decodes the narrow-band data for output to the display device. The gateway transfers the wide-band data to the wide-band network. The decoder receives the wide-band data and recombines the wide-band data with the narrow-band data for output to the display device. Thus, criteria may be established to efficiently determine the dynamic routing of the requested data between the wide-band network and the low bit rate network to the decoder. Criteria include the type of Internet data requested, the availability of bandwidth, size of the Internet data, and added costs associated with transmitting using the wide-band network.

An apparatus and method for seamless connectivity between the Internet and an interactive TV wide-band network are provided. The gateway supports a high performance computer for executing the native protocols of the Internet. The gateway parses the Internet data, which enables the low processing power decoders to process the Internet data for display. Thus, lower cost decoders with low processing power can function to provide Internet access.

Other aspects and advantages of the present invention can be seen upon review of the figures, the detailed description, and the claims that follow.

DETAILED DESCRIPTION

The invention will be described with respect to the Figures, in which FIG. 1 generally shows a digital transmission system, for example a direct broadcast satellite system. It is presumed that a single satellite transponder accommodates a plurality of respective TV programs in time division multiplexed format.

Figure 1:
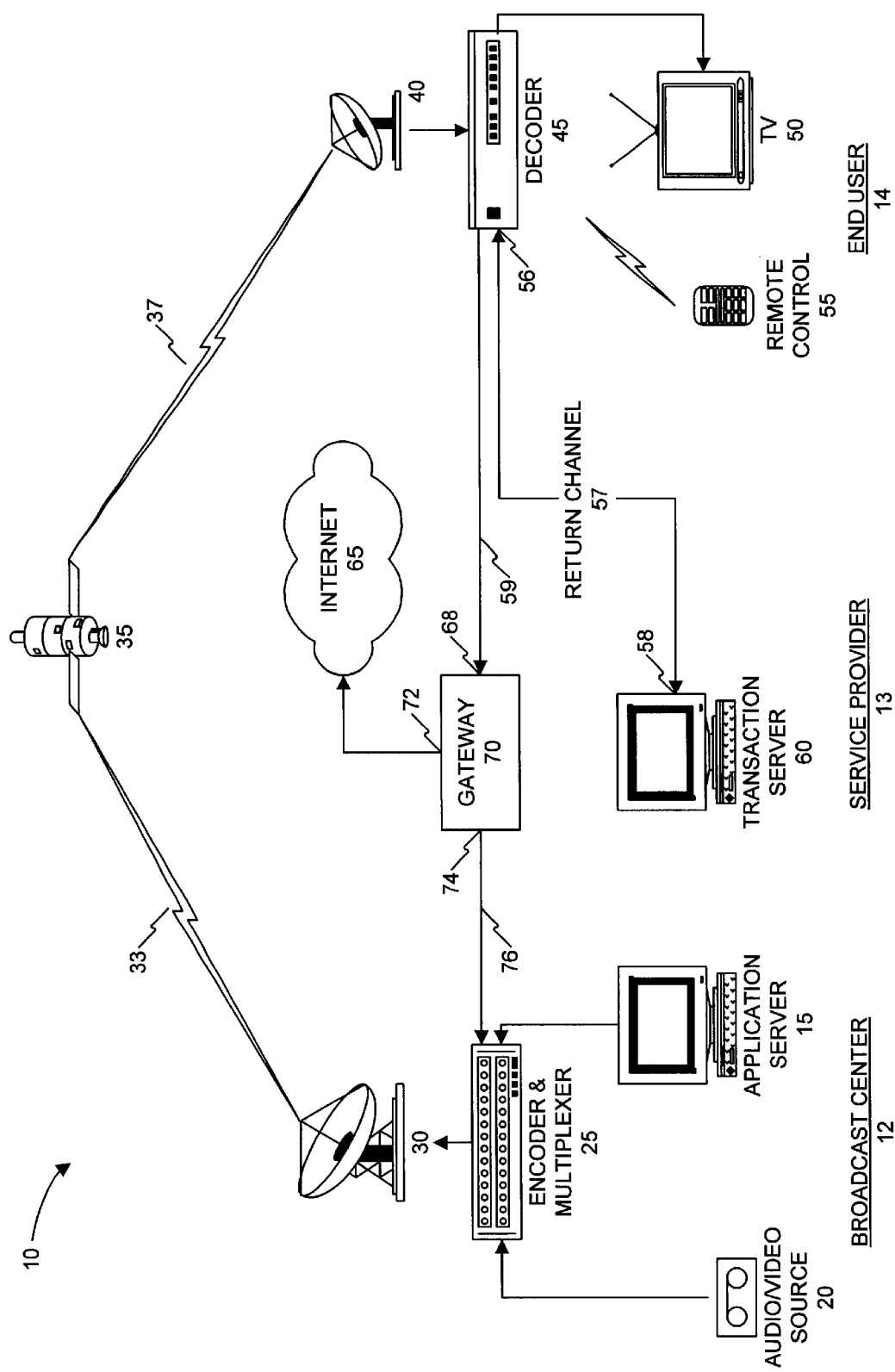
FIG. 1 illustrates a system level block diagram for digital transmissions in a direct broadcast satellite system for a wide-band network.

Referring to FIG. 1, the direct broadcast satellite system 10 provides a wide-band network that includes a broadcast center 12, service provider 13, and an end user 14. The broadcast center 12 includes an application server 15, an audio/video source 20, encoder and multiplexer 25, and satellite transmitter 30. The application server 15 controls execution of interactive TV applications that are loaded into the logic circuits of the application server 15 to perform a series of specifically identified operations dictated by the interactive TV applications.

The interactive TV applications include associated audio and video information sources 20. The application server 15 synchronizes the interactive TV applications and the associated audio and video information sources 20 into transport packets that provide inputs to the encoder and multiplexer 25. The encoder and multiplexer 25 receives the transport packets and encodes the transport packets for transmission. Satellite transmitter 30 time-multiplexes the transport packets and transmits the transport packets as upload signal 33 to satellite 35.

The broadcast center 12 is described in detail in issued U.S. Pat. No. 5,448,568, which is entitled "System of Transmitting an Interactive 5 TV Signal," assigned to Thomson Consumer Electronics, Inc. and issued on Sep. 5, 1995. U.S. Pat. No. 5,448,568 is hereby incorporated by reference in its entirety.

Satellite 35 receives the upload signal 33 and transmits download signal 37 to end user 14. The end user 14 includes satellite dish 40, decoder 45, TV 50, remote control 55, return channel 57, and communication channel 59. Satellite dish 40 receives the download signal 37 and provides an output to decoder 45. The decoder 45 includes a software operating system loaded into the logic circuits of the decoder 45 that performs a series of steps to control the operations of the decoder 45. The decoder 45 receives the download signal 37 from satellite dish 40 and decodes the transmitted interactive TV application and its associated audio and video information 20. The decoder 45 executes the interactive TV application and provides audio and video outputs to TV 50.

Remote control 55 provides inputs to the decoder 45 to select execution of other interactive TV applications for output to TV 50. The decoder 45 includes an input/output port 56 that couples to the return channel 57 for communication to transaction server 60 or the communication channel 59 for communication with gateway 70.

The service provider 13 provides local interaction with the end user 14 and includes the transaction server 60 and the gateway 70. The transaction server 60 includes an input/output port 58 which couples to the return channel 57. The transaction server 60 provides monitoring of transactions performed by the end user 14 and updating of the software operating system for the decoder 45 via the return channel 57. The gateway 70 includes a port 68 that receives a request for Internet data from decoder 45 via the communication channel 59. The return channel 57 and the communication channel 59 may be telephone lines or cable lines and support a low bit rate link.

The gateway 70 includes a port 72 that provides access to Internet 65. The Internet 65 is a narrow-band network commonly known as the world wide web. The gateway 70 retrieves Internet data from the Internet 65 and communicates the Internet data to port 74 of the gateway 70. High speed line 76 transfers the Internet data to the encoder and multiplexer 25, which encodes the Internet data for broadcast to the wide-band network. Decoder 45 receives the encoded Internet data and decodes the Internet data for display on TV 50.

Figure 2:
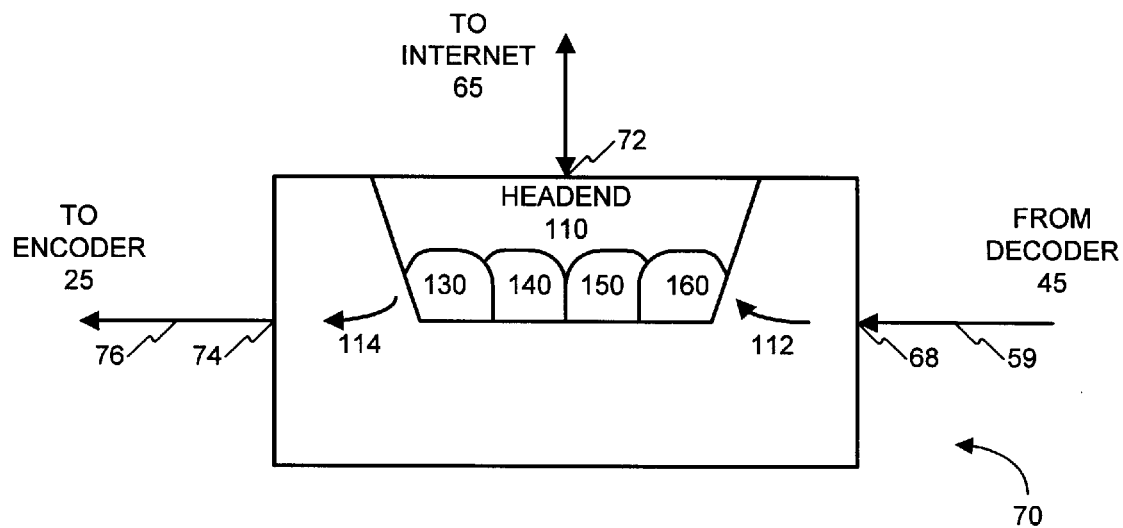
FIG. 2 illustrates a block diagram of an embodiment of a gateway transferring Internet data via the wide-band network according to the present invention.

FIG. 2 illustrates a block diagram of an embodiment of the gateway 70 according to the present invention. The gateway 70 includes a headend 110 that includes circuitry programmed to execute native protocols of the Internet 65. The headend 110 includes an MPEG (Motion Picture Experts Group) encoder 130, renderer 140, cache 150, and parser 160. Port 68 of the gateway 70 receives a data request 112 from decoder 45. Communication channel 59 transfers the data request 112 from the decoder 45 to the port 68. Communication channel 59 is a low bit rate link utilizing telephone lines as the medium for data transfers from the decoder 45 and the gateway 70. The gateway 70 receives the data request 112 for Internet data and forwards the data request 112 to the headend 110.

The headend 110 executes the native protocols for the data request 112 and receives Internet data 114 from the Internet 65. The cache 150 manages latency between the Internet web servers and the headend 110 during retrieval of Internet data 114. The headend 110 transfers the Internet data 114 to port 74 where the high speed line 76 transfers the Internet data 114 to the encoder and multiplexer 25 for encoding. The Internet data 114 includes spatial and temporal correlation encoded data such as rendered MPEG encoded audio and video data. The MPEG encoder 130 and renderer 140 provide the rendered MPEG graphical data. The Internet data 114 is encoded for broadcast by the satellite 30 to the wide-band network. The decoder 45 receives the encoded Internet data and decodes the Internet data for display by TV 50.

Given that the MPEG encoder 130 and renderer 140 process the Internet data 114, the decoder 45 does not require high processing power to render the graphical data from the Internet data 114. The headend 110 provides a simple and high quality graphical interface to the Internet. Flexibility in MPEG encoding and rendering is also achieved. Moreover, the nature of MPEG encoding takes advantage of changes in relation to static portions of a page. Once the static portion of a page is transferred, later transfers provide data that represent changes to the static portions of the page. Thus, various tradeoffs are considered for the transfer of the MPEG data to the decoder such as fixed quality encoding with variable latency or variable quality with fixed latency. Other tradeoffs include fixed bandwidth versus variable bandwidth allocation of the wide-band link. The tradeoffs are taken into account for minimizing the processing of Internet data for the decoder 45.

Figure 3:
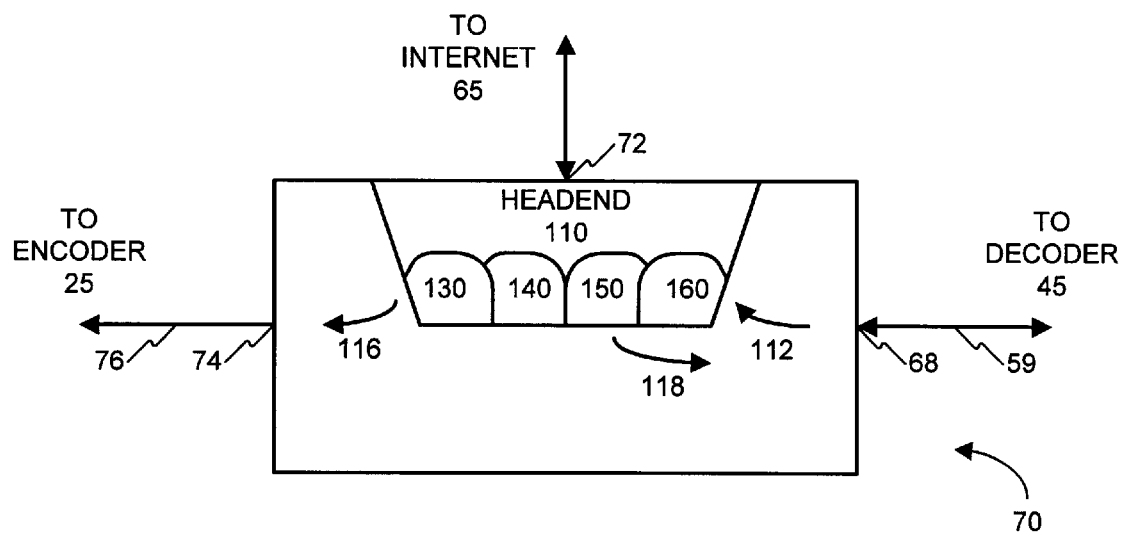
FIG. 3 illustrates a block diagram of another embodiment of the gateway transferring Internet data via the wide-band network and the communication channel according to the present invention.

FIG. 3 illustrates a block diagram of another embodiment of the gateway 70. The gateway 70 includes a headend 110 that includes circuitry programmed to execute native protocols of the Internet 65. Port 68 of the gateway 70 receives a data request 112 from decoder 45. Communication channel 59 transfers the data request 112 from the decoder 45 to the port 68. Communication channel 59 is a low bit rate link utilizing telephone lines as the medium for data transfers between the decoder 45 and the gateway 70. The gateway 70 receives the data request 112 for Internet data and forwards the data request 112 to the headend 110.

The headend 110 executes the native protocols for the data request 112 and receives Internet data 114 from the Internet 65. The parser 160 parses the Internet data 114 into wide-band data and narrow-band data such as graphical data and textual data. The headend 110 determines routing of the parsed Internet data between the wide-band links and the narrow-band links based on criteria such as cost, availability of bandwidth, size of data, and type of data. For example, small sized data may be transferred using the slower low bit rate link. Real time data on the other hand, such as video or audio data, are transferred using the faster wide-band network.

Referring to FIG. 3, the gateway 70 receives the wide-band Internet data 116 and transfers the wide-band Internet data 116 to port 74 where the high speed line 76 transfers the wide-band Internet data 116 to the encoder and multiplexer for encoding. After encoding the wide-band Internet data 116, satellite 30 broadcasts the encoded Internet data to the wide-band network. The gateway 70, in response to the narrow-band data 118, transfers the narrow-band Internet data 118 to port 68 where the communication channel 59 transfers the narrow-band Internet data 118 to the decoder 45. The decoder 45 receives the encoded wide-band Internet data 116 from the wide-band network and the narrow-band Internet data on communication channel 59. After decoding the encoded wide-band Internet data 116, the decoder 45 circuitry recombines the wide-band Internet data 116 with the narrow-band Internet data 118 to provide display data for display by TV 50.

The decoder 45 includes circuitry that renders the graphical data for display by TV 50. Bandwidth consumption of the wide-band network is reduced by parsing the Internet data to provide graphical data and textual data and by using the narrow-band network to transfer the parsed Internet data.

Figure 4:
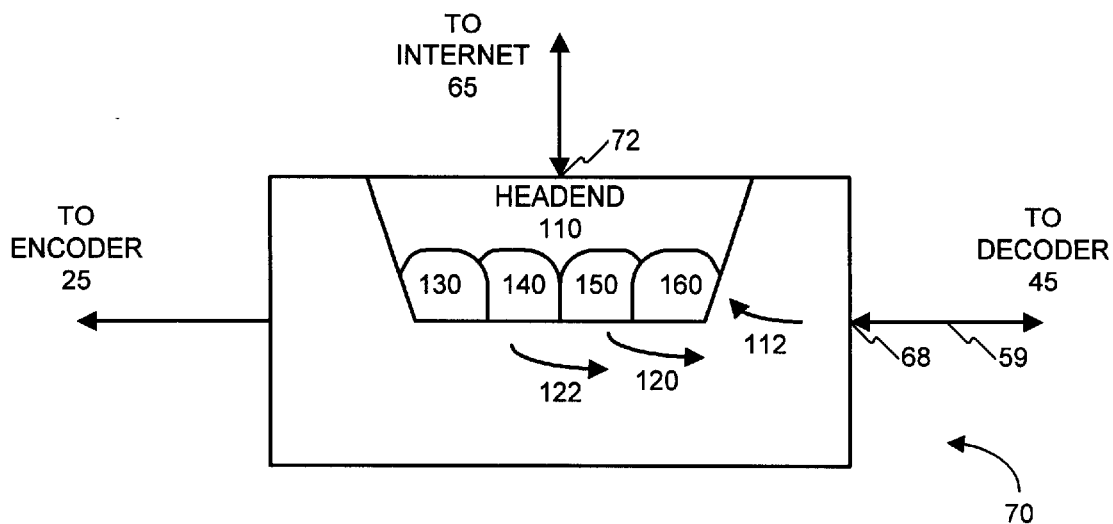
FIG. 4 illustrates a block diagram of another embodiment of the gateway transferring Internet data via the communication channel according to the present invention.

FIG. 4 illustrates another embodiment of the gateway 70 according to the present invention. As decoder 45 receives a request to access the Internet 65, the decoder tunes to a specific channel on the wide-band network and downloads an interactive TV application associated with Internet access. The interactive TV application includes an Internet web browser similar to Netscape Navigator™ developed by Netscape Communications Corporation and instruction codes that program circuitry within the decoder 45 to establish the communication channel 59 to contact the gateway 70. Thus, the decoder 45 includes additional circuitry for increased processing power that enables execution of a world wide web browser at the decoder 45.

As the decoder 45 receives inputs for Internet requests 112, the Internet requests 112 are transferred to port 68 of the gateway 70 via the established communication channel 59. The gateway 70 transfers the Internet requests 112 to the headend 110. The headend 110 includes circuitry programmed to retrieve the requested Internet data. Once the requested Internet data is retrieved, the headend 110 parses the Internet data to provide text 120 and control devices 122 for the particular web page. The control devices 122 include functional buttons and scrolling functions for the web page.

The gateway 70 transfers the text 120 and the control devices 122 to the decoder 45 via communication channel 59. The text 120 and the control devices 122 provide inputs to the Internet web browser, which enables the decoder 45 to reconstruct the requested Internet data. As the decoder 45 requests additional web pages, the headend 110 transfers additional text 120 and control devices 122 associated with the additional web pages via the communication channel 59. Thus, as the decoder possesses more processing power, the amount of data and the rate of transfer for the data to support Internet browsing is reduced.

Figure 5:
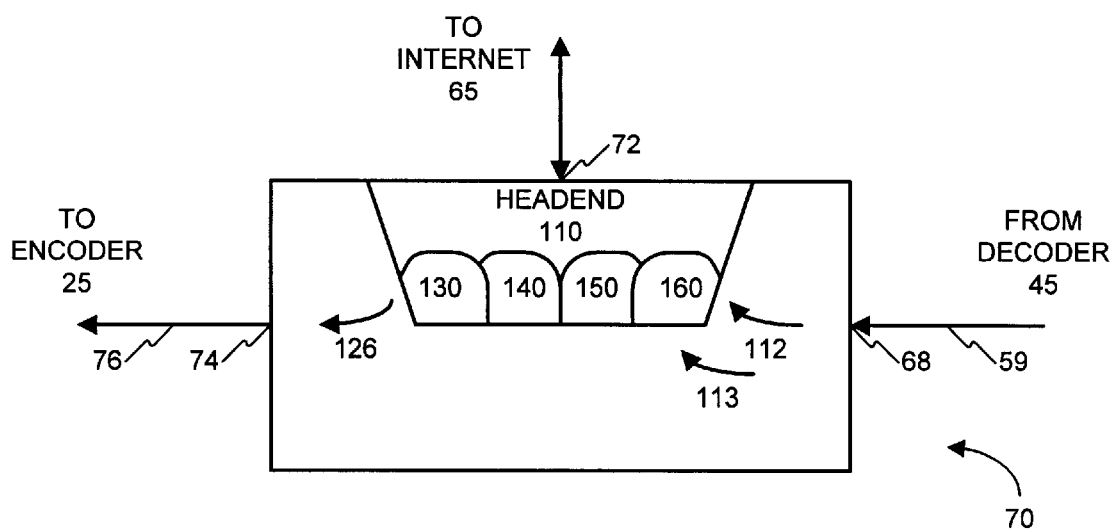
FIG. 5 illustrates a block diagram of another embodiment of the gateway transferring a plurality of Internet data for repeated broadcasts via the wide-band network according to the present invention.

FIG. 5 illustrates another embodiment of the gateway 70 according to the present invention. During instances when requests for access to the Internet 65 are abundant, certain web pages on the Internet 65 are more popular and are repeatedly requested. The headend 110 includes the cache 150 and circuitry programmed to statistically monitor and store repeated retrievals of the more popular web pages from the Internet 65. Data from the statistical monitoring establish controls for re-broadcasting the more popular web pages to the wide-band network. Re-broadcasting the more popular web pages enables faster responses to decoders 45 that request those web pages.

For example, Internet requests 112 and 113 request similar Internet data and are received at port 68 via communication channel 59 from a plurality of decoders 45. The gateway 70 forwards the Internet requests 112 and 113 to the headend 110. The headend 110 retrieves the requested Internet data 126 and determines that the Internet data are frequently requested and notifies the headend 110. As the headend 110 transfers the requested Internet data 126 to port 74 for transfer to the encoder 25 via the high speed line 76, the encoder 25 is also notified that the requested Internet data 126 is to be re-broadcasted. The encoder 25 encodes the requested Internet data 126 for broadcast by the satellite 30 and notifies the satellite to repeatedly broadcast the encoded Internet data. The satellite 30, in response to the notification, re-broadcasts the requested Internet data 125 received from cache 150 at regular intervals. Increased decoder response is achieved by having the popular web pages stored in cache 150 and regularly broadcasted rather than having each individual decoder submit requests to the gateway 70 to retrieve the same popular web pages.

In a further embodiment of the invention, the decoder 45 includes circuitry programmed to select particular web pages that have been requested from the repeated broadcasts of the popular web pages. The other web pages received from the wide-band network are filtered and ignored by the decoder 45. Thus, the decoder 45 is programmed to select from the popular web pages broadcasted onto the wide-band network those web pages that the decoder 45 had requested. Re-broadcasting the popular web pages enables the gateway 70 to operate with higher efficiency by avoiding repeated accesses to Internet 65. Furthermore, latency associated with accessing the Internet 65 is reduced by having the popular web pages readily downloadable from the wide-band network. Depending on the traffic for accessing particular web pages, latency associated with accessing the particular web pages can be of long duration. Thus, repeated broadcasts of popular web pages from the Internet 65 increases response time to the decoder 45 when accessing the Internet.

Accordingly, an apparatus for seamless connectivity of wide-band networks and narrow-band networks has been provided. The gateway provides an interface between the wide-band network and the narrow-band network. Accessing the Internet, which resides on the narrow-band network, from the wide-band network base is transparent to the users of the decoder on the wide-band network. Depending on the type of Internet data and the sophistication of the circuitry of the decoder, the Internet data is transferred over the wide-band network or the low bit rate communication channel of the decoder or a combination of both. Although the embodiments for seamless connectivity of wide-band networks and narrow-band networks have been disclosed with reference to an interactive TV system operating in a satellite transceiving network and the Internet, variations of the seamless connectivity interface according to the present invention are applicable in other network applications.

The foregoing description of a preferred embodiment of the invention has been presented for purposes of illustration and description. It is not intended to be exhaustive or to limit the invention to the precise forms disclosed. Obviously, many modifications and variations will be apparent to the practitioners skilled in the art. It is intended that the scope of the invention be defined by the following claims and their equivalents.

What is claimed is:

1. A method of seamless connectivity on a hybrid network for interfacing between a wide-band network and a narrow-band network, comprising the steps:

operating a decoder to provide a display for a display device, wherein the decoder is operated according to input received from a remote control;

interfacing a gateway to a narrow-band network to retrieve narrow-band data in response to a decoder request, wherein the gateway is coupled to the decoder by a first path comprising a wide-band network and by a second path comprising a narrow-band communication link;

parsing the narrow-band data to identify a graphical portion of the narrow-band data to transmit to the decoder via the wide-band network;

rendering the graphical portion of the narrow-band data on the gateway;

encoding the graphical portion of the narrow-band data for broadcast over the wide-band network;

monitoring the decoder request on a transaction server coupled to the decoder;

decoding wide-band data from the wide-band network to retrieve the graphical portion of the narrow-band data; and providing the display device with display data including the graphical portion of the narrow-band data.

2. The method of seamless connectivity according to claim 1, wherein the graphical portion of narrow-band data comprises a web page, further comprising:

caching the web page in the gateway; and automatically re-broadcasting the web page without receiving another request from the decoder.

3. A system for delivering information from a wide-band network and a narrow-band network to a display device, comprising:

a gateway configured to retrieve data from a narrow-band network, said gateway comprising:

a parser configured to parse said data into graphical data and a first set of data; and a renderer configured to render said graphical data;

an encoder configured to encode said graphical data; and a decoder coupled to said gateway and configured to receive wide-band data from a wide-band network and narrow-band data from one of said wide-band network and said gateway;

wherein said decoder is coupled to a display device configured to produce said narrow-band data and said wide-band data in a combined display.

4. The system of claim 3, further comprising:

a wireless remote control for operating said decoder to retrieve said data from said narrow-band network.

5. The system of claim 3, wherein said decoder is configured to merge said narrow-band data and said wide-band data for said combined display on said display device.

6. The system of claim 3, wherein said gateway is configured to transmit said graphical data to said decoder via said wide-band network.

7. The new system of claim 3, wherein said narrow-band data further includes audio data.

8. The system of claim 6, wherein said gateway is further configured to transmit said first set of data to said decoder via a communication link.

9. The system of claim 3, wherein said display device is a television.

10. The system of claim 3, further comprising:

a transaction server coupled to said decoder, wherein said transaction server is configured to monitor said decoder and update a program executing on said decoder.

11. The system of claim 10, wherein said program is a web browser.

12. The system of claim 3, wherein said gateway further comprises a cache configured to store a first web page retrieved from the narrow-band network in response to a first request from the decoder;

wherein said decoder is configured to execute a web browser to display said first web page on said display device; and wherein said gateway is configured to automatically re-transmit said first web page after a predetermined period of time without awaiting another request for said first web page.

13. The system of claim 3, wherein said decoder comprises:

a first port coupled to said gateway;

a second port coupled to said wide-band network; and a third port coupled to said display device.

14. The system of claim 3, wherein said gateway further comprises:

a first port coupled to said decoder;

a second port coupled to said narrow-band network; and a third port coupled to said wide-band network.

15. A gateway for delivering information from a narrow-band network to a display device via a wide-band network, comprising:

a first port configured to receive an information request;

a second port configured to retrieve said information from the narrow-band network;

a parser configured to parse said retrieved information into a first set of data and a second set of data;

a renderer configured to render said first set of data; and a third port configured to forward said rendered first set of data for transmission to the display device via the wide-band network.

16. The gateway of claim 15, further comprising a cache configured to cache said first set of data.

17. The gateway of claim 15, wherein said first set of data comprises a web page.

* * * * *

UNITED STATES PATENT AND TRADEMARK OFFICE
CERTIFICATE OF CORRECTION

PATENT NO. : 6,288,738 B1
DATED : September 11, 2001
INVENTOR(S) : Dureau et al.

It is certified that error appears in the above-identified patent and that said Letters Patent is hereby corrected as shown below:

Column 8, claim 7,
Line 51, replace "The new system of claim 3," with -- The system of claim 3, --.

Signed and Sealed this

Twelfth Day of March, 2002

Attest:

JAMES E. ROGAN
*Attesting Officer*    *Director of the United States Patent and Trademark Office*